Figure 1:
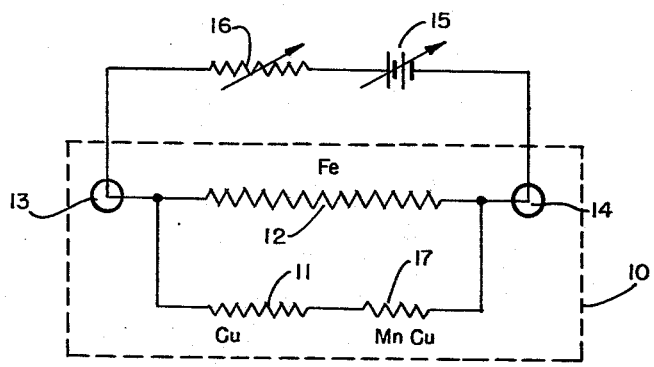

Nov. 26, 1963

L. W. PARKER 3,112,444

TEMPERATURE AND FIELD DENSITY COMPENSATORS
FOR ELECTRICAL INDICATING INSTRUMENTS
Filed Aug. 30, 1960

INVENTOR
Louis W. Parker

BY *Morse & Hall*

ATTORNEYS

United States Patent Office 3,112,444
Patented Nov. 26, 1963

3,112,444
TEMPERATURE AND FIELD DENSITY COMPENSATORS FOR ELECTRICAL INDICATING INSTRUMENTS
Louis W. Parker, Blair Road, Oyster Bay Cove, N.Y.
Filed Aug. 30, 1960, Ser. No. 52,931
9 Claims. (Cl. 324—105)

The present invention is concerned with shunt structures for use in conjunction with electrical indicating instruments, e.g. meters, and adapted to alter the sensitivity of the instrument or meter movement as may be desired; and is more particularly concerned with a novel shunt performing the foregoing function, as well as the additional function of temperature compensation, thereby to render the instrument or movement substantially independent of variations in ambient temperature.

As is well known at the present time, electrical indicating instruments or meter movements may comprise a rotor structure mounted on hair springs between or adjacent to an appropriate magnet structure preferably of the permanent type, whereby a source of current to be measured (or a variable current due to variation in voltage or resistance coupled to said rotor) may cause said rotor to move through an appropriate arc corresponding to the parameter being measured. In such instruments, it has been recognized that some inaccuracy may arise due to variations in ambient temperature, particularly due to variations in the resistance of the meter movement itself, e.g. the rotor coil, which occur as a result of significant changes in temperature adjacent the coil.

Efforts have accordingly been made to render the rotor movement substantially independent of such temperature changes; and various arrangements to this effect have been suggested heretofore. In most instances, however, such compensation structures do not take into consideration further errors which may arise due to changes in temperature, such as variations in field density of the magnet associated with the aforementioned rotor.

In general, field density variations of the types discussed above, due to temperature changes, are ignored due to the selection of the particular magnetic material employed for the permanent magnet structure, which selected material or other portions of the magnet structure associated therewith, are so arranged that field density does not vary significantly with temperature changes. However, in some instances the magnetic material selected may have a significant field density variation with temperature; and the present invention is directed to the compensation of errors due to temperature variation in these latter arrangements.

By way of example, I have described an improved electrical indicating instrument in my prior copending application Serial No. 854,029, filed November 19, 1959, now U.S. Patent No. 3,056,923, issued October 2, 1962, for "Indicating Instruments and Magnetic Structures Therefor." The structure described in this prior copending application comprises a substantially disc shaped rotor, preferably formed of an anodized aluminum plate having copper deposits of coil configurations on the opposed surfaces thereof. This rotor is in turn mounted adjacent a permanent magnet of unique configuration, taking the form of a flat annular magnetic surface disposed generally parallel to the plane of the disc rotor. This arrangement is, in my prior copending application, described to have various advantages. The magnet structure is further described as preferably comprising a ceramic magnetic material. Such ceramic magnetic materials exhibit, as will be discussed hereinafter, a negative temperature coefficient of field density, i.e. the field density of the magnet tends to decrease with increases in ambient temperature, whereby use of the instrument in an environment subject to significant temperature changes may cause errors of reading to arise. When such ceramic magnetic materials, or other magnetic materials having a field density temperature coefficient are employed, the field density variation should be compensated somehow to assure substantially accurate reading notwithstanding changes in ambient temperature.

The rotor of the instrument, comprising copper or other conductor material normally exhibits a positive temperature coefficient of resistivity wherefore, on first impression, it would tend to compensate the negative temperature coefficient of the field structure. As a practical matter, however, this is not the case, since the temperature coefficients of the rotor and magnet structure are significantly different from one another whereby a significant error in reading may still arise; and the present invention is accordingly directed to an arrangement which not only takes into consideration the field density coefficient of the magnet, but which also takes into consideration the different magnitudes of temperature coefficient normally exhibited by the magnet and rotor respectively, whereby substantially complete compensation may be effected.

It is accordingly an object of the present invention to provide an improved shunt structure for use with electrical indicating instruments of the type utilizing ceramic or other magnets having a temperature coefficient of field density.

A further object of the present invention resides in the provision of an improved shunt structure adapted to enable the use of meter movements over a comparatively wide range of sensitivities, including sensitivity variations due to normal production variations in the meter movement as well as in the shunts themselves.

A still further object of the present invention resides in the provision of an improved shunt structure adapted to not only change the range of an electrical indicating instrument but also adapted to effect temperature compensation of said instrument.

A still further object of the present invention resides in the provision of an electrical indicating instrument adapted to operate in environments having significant temperature variations and adapted to give substantially accurate readings in such environments, notwithstanding temperature coefficients exhibited by the rotor and field structure of the instrument.

A still further object of the present invention resides in the provision of an electrical indicating instrument associated with a shunt and so arranged as to eliminate any error in reading due to contact resistance between the connecting terminals and the shunt.

In providing for the foregoing objects and advantages, the present invention contemplates the provision of an electrical indicating instrument, preferably of the type described in my aforementioned prior copending application Serial No. 854,029 associated with a shunt structure arranged and comprising materials adapted not only to effect changes in indicating range of the instrument, but also adapted to effect temperature compensation. The arrangement and materials of the shunt structure are preferably related to the materials and temperature coefficient of the rotor structure in such manner that the shunt and rotor exhibit different temperature coefficients of resistivity of the same sense; with the difference between the temperature coefficients of the shunt and rotor being so selected as to provide a resultant percentage change of current through the combined shunt and rotor substantially equal in magnitude to and opposite in sense to the field density variation produced by temperature changes adjacent the permanent magnet.

Appropriate selection of the materials comprising the shunt structure, in relation to the materials comprising the rotor structure, thus permits a temperature compensation closely approximating that necessary to eliminate errors due to field density variations of the magnet structure for a given change in temperature; and, as will be discussed hereinafter, substantially perfect temperature compensation may be achieved by adding a further compensating resistance having substantially zero temperature coefficient of resistivity in series with the rotor.

Figure 2:
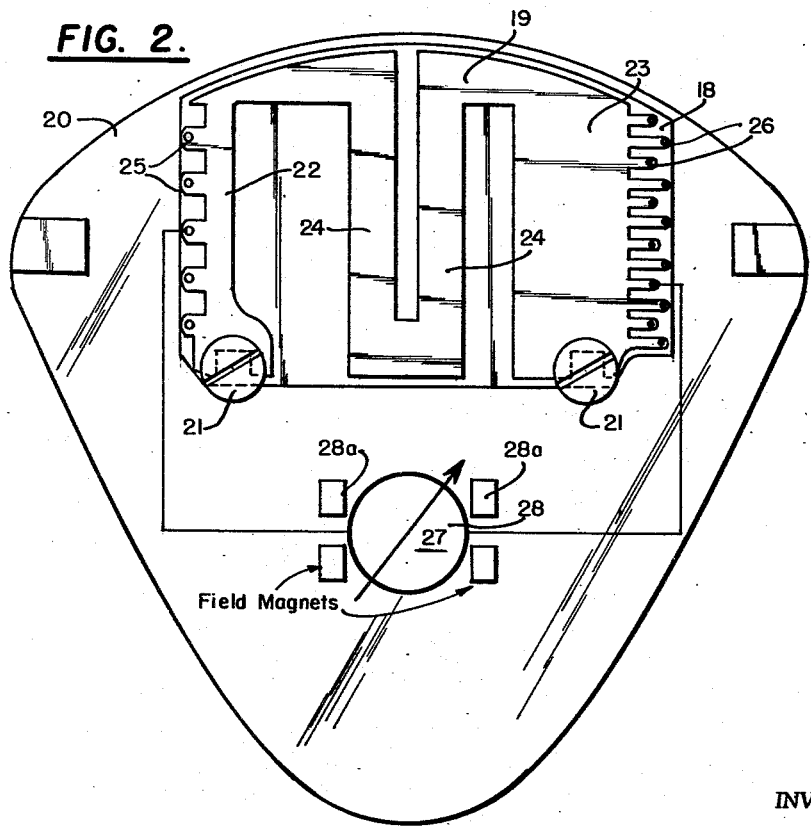

The foregoing objects, advantages, construction and operation of the present invention will become more readily apparent from the following description and accompanying drawings, in which:

FIGURE 1 is an illustrative equivalent schematic of a shunted meter structure constructed in accordance with the present invention; and FIGURE 2 is an illustrative view of an improved shunt constructed in accordance with the present invention and associated with a schematically depicted meter movement.

In electrical indicating instruments of the type discussed before, the permanent magnet structure may, due to its material, exhibit a significant field density temperature coefficient. By way of example, when the instrument utilizes a ceramic permanent magnet, e.g. of the type described in my patent application Serial No. 854,029 identified above, the magnet itself may exhibit a number of advantages over conventional magnets; but such magnets, and indeed other magnetic materials, may further exhibit a relatively high negative temperature coefficient. A typical ceramic material employed in such magnets may, for example, exhibit a field density drop of substantially 0.19% for each degree centigrade increase in temperature. The rotor structure, when it comprises copper, exhibits a positive temperature coefficient of resistivity on the other hand; and the increase in resistance of a copper rotor is substantially 0.4% for each degree centigrade increase in ambient temperature. The positive temperature coefficient of the rotor does not compensate for the negative field density temperature coefficient of the field magnet because any increase in the copper coil temperature reduces the current through said coil.

The present invention, by appropriate selection and arrangement of the shunt structure in effect alters the temperature coefficient of resistivity of the rotor to provide a resultant positive temperature coefficient of resistivity which is substantially equal in magnitude to the negative temperature coefficient of field density exhibited by the magnet structure, thereby to provide the desired temperature compensation.

Thus, in the arrangement of FIGURE 1, a schematically illustrated meter movement has been designated 10. This meter movement comprises a rotor resistance 11 (which may be connected in series with another compensating resistance 17, to be described hereinafter); and the rotor 11 may in turn be connected across all or a portion of a temperature compensating shunt 12. The opposing ends of the shunt 12 are in turn coupled to terminals 13, 14 which are supplied by current from a source 15 through a load 16; and either or both of components 15 and 16 may be variable, the arrangement 15, 16 corresponding to the external source which is to be measured by the instrument or which is employed to control movement of the rotor 11.

In order to analyze the arrangement shown in FIGURE 1, it is first assumed that the current through shunt 12 is very much greater than that through meter coil 11 (and resistance 17, if such resistance be provided). As a result, the change in voltage drop across shunt 12 is assumed to be substantially negligible when the rotor coil 11 and shunt 12 are paralleled as illustrated. The field structure, comprising a ceramic magnetic material, exhibits as discussed previously a negative field density temperature coefficient whereby its field density tends to drop substantially 0.19% for each degree centigrade increase in temperature. The rotor 11, comprising copper, exhibits a positive temperature coefficient of resistivity wherefore the resistance of meter coil 11 will increase about 0.4% for each degree centigrade increase in temperature.

In order to effect compensation in such an arrangement, the shunt 12 may, in accordance with one embodiment of the invention, be made of iron; and accordingly exhibits a positive temperature coefficient of resistivity of such magnitude that the resistance of shunt 12 (of iron) tends to increase approximately 0.5% for each degree centigrade increase in temperature. If we for the moment ignore resistance 17, i.e. it is assumed that resistance 17 is short circuited, the differences in temperature coefficient of resistivity of the iron shunt 12 and copper coil 11 therefore produce an increase of current through rotor resistance 11, for each degree centigrade increase in temperature of substantially 0.5% minus 0.4% or 0.1%; and as a result, the resultant increase in current through the parallel arrangement 11, 12 is substantially 0.1% in a positive direction as compared with the negative field density change of 0.19% exhibited by the field structure.

In addition to the foregoing considerations, it has also been found that there is a change in the elasticity of the hair springs in the meter of 0.04% in the positive direction whereby the change of elasticity of the hair spring partially compensates for the change in field density of the field structure. This partial compensation is such that the negative 0.19% change of magnet field density, when partially compensated by the positive 0.04% change in elasticity of the hair spring, leaves a negative 0.15% change in resultant field density for each degree centigrade increase in temperature. This negative 0.15% change, when compared with the positive 0.1% change in current through the rotor coil 11 effected by the arrangement already described, thus results in a net change of 0.05% in a negative direction for each degree centigrade increase in temperature. This small temperature coefficient can be left in the finished instrument in most cases without further effort to compensate it completely.

If desired, the aforementioned small temperature error can be further compensated and substantially completely eliminated by the addition of a further temperature compensating resistance 17 in series with the rotor resistance 11, the series connected rotor resistance 11 and temperature compensating resistance 17 being connected as illustrated across iron shunt 12. This further temperature compensating resistance 17 should be selected of a material having substantially zero temperature coefficient of resistivity such as for example manganin, manganese-copper, or the like.

The purpose of resistance 17 is to reduce the combined temperature coefficient of rotor coil 11 and added resistance 17 from the 0.4% change exhibited by the rotor alone to a resultant change of substantially 0.35%. In order to effect this reduction in resultant temperature coefficient, the added compensating resistance 17 should have a value of substantially $\frac{1}{7}$ that of rotor resistance 11. The reasoning behind this selection of the magnitude for resistance 17 is that $\frac{1}{7}$ of 0.35% is 0.05%, wherefore by adding $\frac{1}{7}$ the resistance of a zero temperature coefficient material to the copper resistance of rotor coil 11, the resultant coefficient of the sum of the copper coil 11 and zero temperature coefficient material in resistance 17 drops by substantially $\frac{1}{7}$. With this further compensation, the resultant temperature coefficient of the branch 11—17 is 0.35% in a positive direction, while the shunt 12 has, as already discussed, a temperature coefficient producing a positive percentage current change of 0.5% thereby producing a resultant positive change in current of 0.15% through the combined arrangement of elements 11, 12 and 17; and this positive 0.15% change, of course, substantially compensates entirely for the negative 0.15% change produced by the combined effect of the field magnet and hair springs.

A preferred shunt corresponding to shunt resistance 12 of FIGURE 1 is illustrated in FIGURE 2. The shunt itself preferably comprises a lamination 19 of sheet iron mounted on an insulated supporting surface 18, with said supporting surface 18 and lamination 19 being in turn held on a backing plate 20 comprising the back surface of the entire meter movement, as described in my prior copending application Serial No. 854,029. Insulating structure 18 and lamination 19 may in fact be held on said backing plate 20 (which is preferably constructed of plastic) by a pair of screws 21 passing through the shunt 18—19 and through apertures in the backing plate 20. Screws 21 comprise conductive material, wherefore they also serve the purpose of conducting current to and through the shunt; and to this effect the opposing ends of the shunt are arranged to electrically contact the screws 21, as illustrated, wherefore screws 21 correspond to the terminals 13 and 14 already discussed in reference to FIGURE 1.

Iron lamination 19, comprising the shunt resistance itself, is preferably of convolute configuration, and includes a pair of outer linear members 22 and 23 connected to a pair of interconnected inner members 24, as illustrated; the lower ends of the outer members 22 and 23 engaging supporting and terminal screws 21, as also illustrated. Each of the outer members 22 and 23 is also formed to provide a plurality of tap connections arranged in groups as shown, with member 22 being provided with a group of tap connections 25, while member 23 is provided with a further group of differently spaced tap connections 26. The several tap connections 25 and 26 are so located that the voltage drops between adjacent taps 25 is in the order of 5% of the total drop across the shunt, whereas the voltage drops across adjacent taps 26 is in the order of ½% of the total drop. Meter movement 27, comprising a rotor 28 associated with magnetic structures 28a, is connected as shown to one of said taps 25 as well as to one of said taps 26; and due to the range of voltages which are available at the several taps 25 and 26, production variations in the sensitivity of the meter or production variations in the shunts themselves, can be taken up by appropriate selection of the taps 25 and 26 for use in connecting the meter movement 27.

By way of example, in the case of a one ampere shunt, one ampere may be sent through the combined shunt and meter movement and the unit may be calibrated to provide one ampere full-scale deflection by connecting the meter movement 27 to appropriate taps 25 and 26 which give such full-scale deflection, regardless of how many millivolts (within a reasonable range) such full-scale deflection may take.

In accordance with one of the specific improvements of the present invention, it should be noted that the meter movement 27 is, in accordance with the present invention, connected only to the shunt and not to terminals 21. As a result, any variation in contact resistance between terminals 21 and shunt 19 does not affect the voltage drop across the meter; and this represents a significant improvement over arrangements suggested heretofore wherein the meter movement is connected directly to the input terminals.

It should further be noted that the insulating supporting member 18 may take various forms. In the case of low current shunts (e.g. one amp. shunts) the iron lamination comprising shunt 19 may be laminated directly on any conventional insulator such as Bakelite. The system, however, may also be employed to provide shunts for substantially higher currents through appropriate selection of the backing material 18; and in such higher current embodiments the iron shunt lamination can be applied to an insulated metallic supporting member such as anodized aluminum in which event the supporting member 18 acts as a heat sink.

Indeed, as will be apparent to those skilled in the art, it is sometimes advantageous for high current shunts of the types discussed above to be made of copper rather than of iron; and copper sheet is readily available with an adhesive backing thereon for printed circuit applications thereby facilitating the fabrication of shunts arranged as shown in FIGURE 2, but utilizing a copper lamination rather than an iron lamination. When such a copper lamination is employed in the shunt, temperature compensation can still be accomplished by altering the nature of the additional compensating resistor 17 so that the combined temperature coefficient of the added resistor 17 and rotor coil 11 is again below that of the shunt 12; and in such a case it will be appreciated that the ratio of resistances 11 and 17 will be below that of 7:1 as given in the previous example.

In particular, referring again to the foregoing conditions, it will be noted that if the shunt is made of copper, its resistance will increase 0.4% for each degree centigrade. Since the meter movement requires a compensation of −0.15%, as already discussed, the combined temperature coefficient of meter coil 11 and added resistor 17 should be 0.4−0.15 or 0.25%. To accomplish this, the zero coefficient resistor 17 should now be 0.67 times as high in value as the resistance of the copper meter coil 11. In this way, by adding resistor 17, the total resistance of the meter branch comprising coil 11 and said added resistance 17 (see FIGURE 1) is increased by 60% over the resistance value of the coil 11 alone; but the total change, with an increase in temperature for each degree centigrade, is still the same as would be the case without this addition, i.e. 0.4% of coil resistance 11.

Stating the matter in another way, 0.4 times 100 would be 0.4%; but if the total resistance is increased by 60% the combined temperature coefficient would be 0.4 times 160, or only 0.25%. With this alteration, a temperature increase of one degree centigrade will increase the voltage across the copper shunt 12 by 0.4% but will increase the resistance across the copper coil 11 and added zero temperature coefficient resistor 17 by only 0.25%. As a result, there will be an increase in the current through the meter coil 11 of approximately 0.15% which is equal in magnitude and opposite in sense to the drop in sensitivity of the meter movement due to the combined temperature characteristics of the magnetic and hairspring structures, as already described.

It should be noted, of course, that in all the previous calculations it has been assumed that the voltage across the shunt does not drop when the meter movement is connected across it. Inasmuch as this is only approximately true, the calculations given above are also only approximate; but the basic principles nevertheless apply.

Other variations will be suggested to those skilled in the art, and it must therefore be emphasized that the foregoing description is meant to be illustrative only and should not be considered limitative of my invention. All such variations and modifications as are in accordance with the principles described, are meant to fall within the scope of the appended claims.

Having thus described my invention, I claim:

1. In a meter, a rotor circuit the resistance of which increases with increases in ambient temperature, said rotor circuit including a rotor coil mounted for movement adjacent a ceramic permanent magnet the field density of which decreases with increases in ambient temperature, a shunt structure adapted to simultaneously compensate for temperature responsive field density variations of said magnet as well as for temperature responsive resistance changes of said rotor coil, said shunt structure consisting of an iron resistor having a resistive temperature coefficient greater in magnitude than but of the same sense as the resistive temperature coefficient of said rotor circuit, means for coupling a source of current to be measured to said shunt, and means for parallel connecting said rotor circuit across said shunt, the magnitude difference in temperature coefficients of said rotor circuit and shunt being selected to produce a percentage current change, with changes in temperature, through said parallel connected rotor circuit and shunt substantially equal in magnitude and opposite in sense too the percentage change in field density of said magnet with said changes in temperature.

2. The combination of claim 1 wherein said rotor circuit includes further temperature compensating means comprising a resistor of substantially zero temperature coefficient material connected in series with said rotor coil, said series connected rotor coil and zero temperature coefficient resistor being connected in parallel with said shunt, said zero temperature coefficient resistor having a resistive magnitude smaller than that of said rotor.

3. The combination of claim 2 wherein said zero temperature coefficient resistor has substantially ½ the resistive magnitude of said rotor.

4. In a meter of the type comprising a rotor having a copper coil mounted for movement adjacent a permanent magnet of ceramic material the field density of which varies with changes in ambient temperature, a shunt structure adapted to vary the sensitivity of said instrument and simultaneously to compensate for temperature responsive field density variations of said magnet, said shunt structure comprising an iron resistor having a resistive temperature coefficient of the same sense as, but of greater magnitude than, the resistive temperature coefficient of said meter rotor and opposite in sense to the field temperature coefficient of said magnet, said shunt being connected in parallel with said rotor coil, the percentage current change through said parallel connected shunt and coil, due to said differences in resistive temperature coefficient magnitude, being opposite in sense and substantially equal in magnitude to the percentage change in the field density of said magnet for a given change in ambient temperature.

5. The structure of claim 4 wherein said iron resistor comprises an iron lamination, of convolute configuration, mounted upon a planar supporting member.

6. The combination of claim 5, wherein said planar supporting member comprises an insulating material.

7. The combination of claim 5 wherein said planar supporting member comprises an aluminum plate having an anodized insulating surface for supporting said iron lamination in heat transfer proximity to said aluminum plate.

8. In a meter, a rotor circuit including a rotor having a positive resistive temperature coefficient mounted for movement adjacent a ceramic permanent magnet having a negative field density temperature coefficient, and means for compensating for temperature responsive field density variations of said magnet comprising an iron resistor, smaller in magnitude than the resistive magnitude of said rotor, but having a positive resistive temperature coefficient greater than the resistive temperature coefficient of said meter rotor, said resistor having at least a portion thereof connected in parallel with said meter rotor.

9. The combination of claim 8 wherein said temperature compensating means includes a further resistor, smaller in magnitude than the resistive magnitude of said rotor, connected in series with said rotor, said series connected rotor and further resistor being connected in parallel with said portion of said iron resistor, said further resistor having substantially zero resistive temperature coefficient.

References Cited in the file of this patent

UNITED STATES PATENTS

| | | |
|---|---|---|
| 1,614,174 | Atwood | Jan. 11, 1927 |
| 1,667,624 | Corson | Apr. 24, 1928 |
| 1,807,852 | MacGahan | June 2, 1931 |
| 2,673,957 | Rozett | Mar. 30, 1954 |

FOREIGN PATENTS

| | | |
|---|---|---|
| 376,570 | France | Aug. 13, 1907 |